Sept. 23, 1952  W. M. HARCUM ET AL  2,611,560
AUTOMATIC PILOT FOR AIRCRAFT
Filed July 8, 1944  2 SHEETS—SHEET 1

Patented Sept. 23, 1952

2,611,560

UNITED STATES PATENT OFFICE 2,611,560

AUTOMATIC PILOT FOR AIRCRAFT

William M. Harcum, Garden City, and Gifford Bull, Ithaca, N. Y., assignors to The Sperry Corporation, a corporation of Delaware Application July 8, 1944, Serial No. 543,992

8 Claims. (Cl. 244—78)

This invention relates to automatic pilots for aircraft and, more particularly, to means for turning and banking the craft at the proper angle through the automatic pilot. Our invention has especial application to the type of automatic pilot in which both a directional gyroscope, or other direction maintaining means, and a rate-of-turn gyroscope are normally used to control the rudder for steering in azimuth, but many features thereof, are applicable to other types of pilots.

We are aware that it has been proposed to secure the proper banking angle for a predetermined rate of turn by setting up a selected rate of turn through a variable speed drive at the directional gyroscope and simultaneously setting a banking angle proportional to the rate set up, but such mechanism involves a variable speed device operating in conjunction with the directional gyroscope and other complications which are eliminated by our device, and is not a complete solution.

According to our invention, we sever entirely the control from the directional gyroscope during a turn and depend upon the turn being caused primarily by deflection of the ailerons which primarily cause a bank, the resulting turn being generally not far from the rate which eliminates sideslip. However, the rate gyroscope is left in control of the rudder, but it is biased so that the signal therefrom does not cause the rudder to oppose the turn, but rather to permit a turn at the exact rate which is proper for the banking angle set in. The biasing of the rate gyroscope may be accomplished in several ways such as by biasing the pick-off thereon from the turn-bank knob, or by mixing the basic signals from the gyroscopic horizon and from the rate gyroscope and applying the modified signal to the rudder.

In order that the new course may be continued when the directional gyro control is restored, we have provided means to maintain the pick-off at the directional gyro, when it is thrown out, at a zero position with respect to the gyro so that when the gyro control is re-established, the plane will continue to fly on the new heading which will be shown correctly on the course indicator. Similarly, we likewise apply a zeroing control on the pick-offs on the horizon gyroscope. By this means the automatic pilot may be thrown in at any time without endangering the craft, because the pick-offs are always maintained at zero position and the plane will merely continue in the assumed attitude and heading at the time the pilot is thrown in, until changed by the pilot's turning the control handles provided for the purpose. By this means the automatic pilot is rendered largely foolproof, because it does not have to be centralized manually before being thrown in.

Referring to the drawings illustrating several forms our invention may assume,

Figure 1:
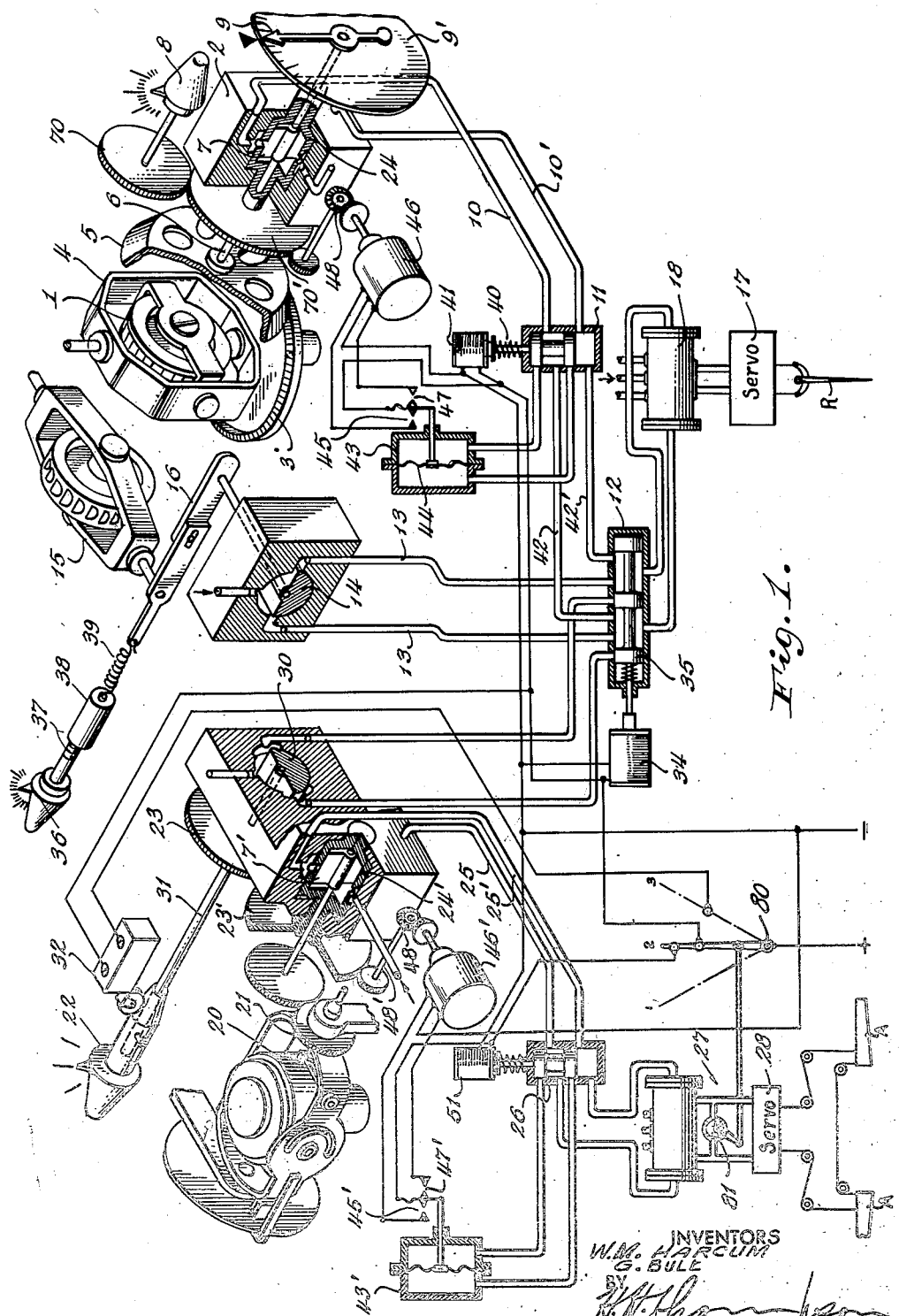
Fig. 1 is a diagrammatic view of our improved rudder and aileron control portions of an automatic pilot. The elevator controls are omitted for the sake of simplicity, being similar, in general, to the aileron control.

Fig. 1 is intended to show our invention as applied, in general, to the form of automatic pilot disclosed in the Kenyon and Zand Patents 2,210,916 and 2,238,300 dated August 13, 1940, and April 15, 1941, respectively. The directional gyroscope is indicated in general at 1 and the pick-off or controller thereon is represented as enclosed within a box 2, the pick-off valve 7 being turned with the apparent movements of the gyroscope in azimuth from annular gear 3 secured to the vertical ring 4 of the gyroscope, which gear meshes with a large annular gear 5 turning shaft 6, on which the pick-off valve 7 is located. Course changes without automatic banking may be effected from knob 8 which is shown as turning a ported sleeve valve 24 surrounding valve 7, through gears 70 and 70'. An azimuth indicator or compass pointer 9 is shown on an extension of shaft 6. The pick-off is preferably of the differential air-flow type shown in the aforesaid patents, and the signals therefrom normally pass through pipes 10 and 10', through the valve 11, and into valve 12, where they are mixed with the signals coming through pipes 13, 13' from the pick-off valve 14 controlled from the rate-of-turn gyroscope 15 through linkage 16. The combined signals operate the servomotor 17 through the usual type of relay valve 18.

Similarly the ailerons are normally controlled from the pick-off valve 1', turned from the horizon gyroscope 20 through gearing 21. To effect banking and consequent turning, we have shown a knob 22 which, when turned, revolves through gears 23, 23', the ported sleeve 24' surrounding the semi-cylindrical valve 7' so as to shift the relation between the pick-off ports and the valve. The turn signals pass out through pipes 25, 25', through valve 26, and thence to the relay valve 27 which controls the servomotor 28 operating the ailerons.

A second valve 30 is also shown on the shaft 31, of knob 22 which valve operates primarily to prevent the signals from the rate gyroscope from counteracting the turn through the rudder. For a banked turn, the knob 22 is not only turned but pushed in, to thereby close a switch within box 32. Closing this switch excites a solenoid 34 which moves the piston valve 35 from the position shown in the drawings, in which the rudder is under the normal control of the combined signals from the directional gyro and rate gyro, to a position in which the signal from the directional gyroscope is cut out and the rudder placed under the control of the opposing signals of the rate gyroscope and the signal from the valve 30 which is proportional to the bank angle. By this arrangement, the rate gyroscope limits the rate of turn of the craft to correspond to the banking angle set in, so that a properly banked turn without side slipping occurs for a predetermined air speed.

Since the proper banking angle varies with air speed as well as rate of turn, we may additionally provide means for introducing an air speed correction, which may be in the form of a knob 36 settable automatically or by hand in accordance with air speed. Rotation of knob 36 turns threaded shaft 37 and screws threaded sleeve 38 in and out to vary the tension on the centralizing spring 39 for the rate gyroscope, the spring strength being increased with increasing air speed to lessen the rudder throw and therefore the rate of turn ($\omega$) for higher air speeds, since centrifugal force (F) varies directly with speed (V) and rate of turn ($\omega$), i. e., $F \propto V\omega$.

In order that the craft may continue upon its new course after a turn, we provide a means to keep the pick-off ports on sleeve 24 at the directional gyroscope continuously centralized or aligned with the butterfly valve 7 on the directional gyroscope when the control from said gyroscope is disconnected, in which position there is zero signal. For this purpose we have shown a transfer valve 11, which is normally kept in the upper position under the influence of the compression spring 40. When, however, the craft is turned, the valve is pushed downwardly, manually or automatically, disconnecting the pipes 10, 10' from pipes 42, 42' extending to mixing valve 12 and connecting the former to the opposite ends of chamber 43 containing a flexible diaphragm 44. We have shown said valve as automatically operated by solenoid 41 which is connected with the switch 32 at handle 22, so that whenever the directional gyroscope control is thrown out, the motor 46 is placed in control of the pick-off ports in sleeve 24 to maintain them in alignment or "zeroed" with respect to the valve 7. Therefore a signal from the directional gyroscope in one direction causes the diaphragm to close one pair of contacts 45 to run the motor 46 in one direction, while a reverse signal will cause closure of contacts 47 to run the motor in the opposite direction. The motor 46 is shown as geared through reduction gearing 48 to a large gear 70' which, as stated, rotates the follow-up sleeve 24 around the directional gyroscope valve so that the ports in the sleeve are maintained aligned with the knife edges on the valve.

The sleeve 24' of the pick-off valve 7' of the horizon gyro is likewise maintained aligned whenever this control is severed. The valve 26, which is similar in function to valve 11, is normally up, as shown, when the pilot is in complete operation. In case, however, the pilot is thrown out, the valve is depressed either manually or automatically to disconnect the ailerons from the gyro control and connect the signals from the gyroscope to a chamber 43', similar to chamber 43 and controlling similar reversing contacts 45' and 47' to operate follow-up motor 46'. This motor is shown as connected through reduction gearing 48' to the gear 23' connected to the sleeve 24', so that the ports in the sleeve are kept centered or aligned at all times with the knife edges on the valve 7.

A master switch 80 is shown for throwing the pilot, as a whole, in and out. This switch has preferably three positions: (1) the "off" position, in which the electrical system is paralyzed and the hydraulic system bypassed; (2) the position in which the hydraulic system remains bypassed but the electrical and pneumatic systems are energized so that all pick-offs are aligned and their output zeroed; and (3) the operating position in which bypass valve 81 is closed to energize the hydraulic system and the automatic alignment thrown out. In the second position, it will be noted, the solenoids 34, 41 and 51 are all energized and the centralizing or aligning motors 46 and 46' ready to operate upon the closing of their reversing switches 45 and 45'. In the third position, the solenoids 34 and 41 and motor 46 are made ready to be placed in circuit with the main supply, the solenoids being energized in case the series switch 32 is closed, and the motor being energized when both the switch 32 is closed and one of the pairs of contacts 45 or 47 is closed. Position (3) can only be reached by passing through position (2), and hence the automatic pilot can never be thrown in without first aligning the gyro pick-offs, the master switch being so arranged that, by any known delayed action device, sufficient time is allowed for all pick-offs to be aligned before position 3 is reached. It will be understood, of course, that the various dead-end pipes on which arrows are shown are connected to a source of air or oil pressure (or vacuum) for energizing the pneumatic and hydraulic systems.

Figure 2:
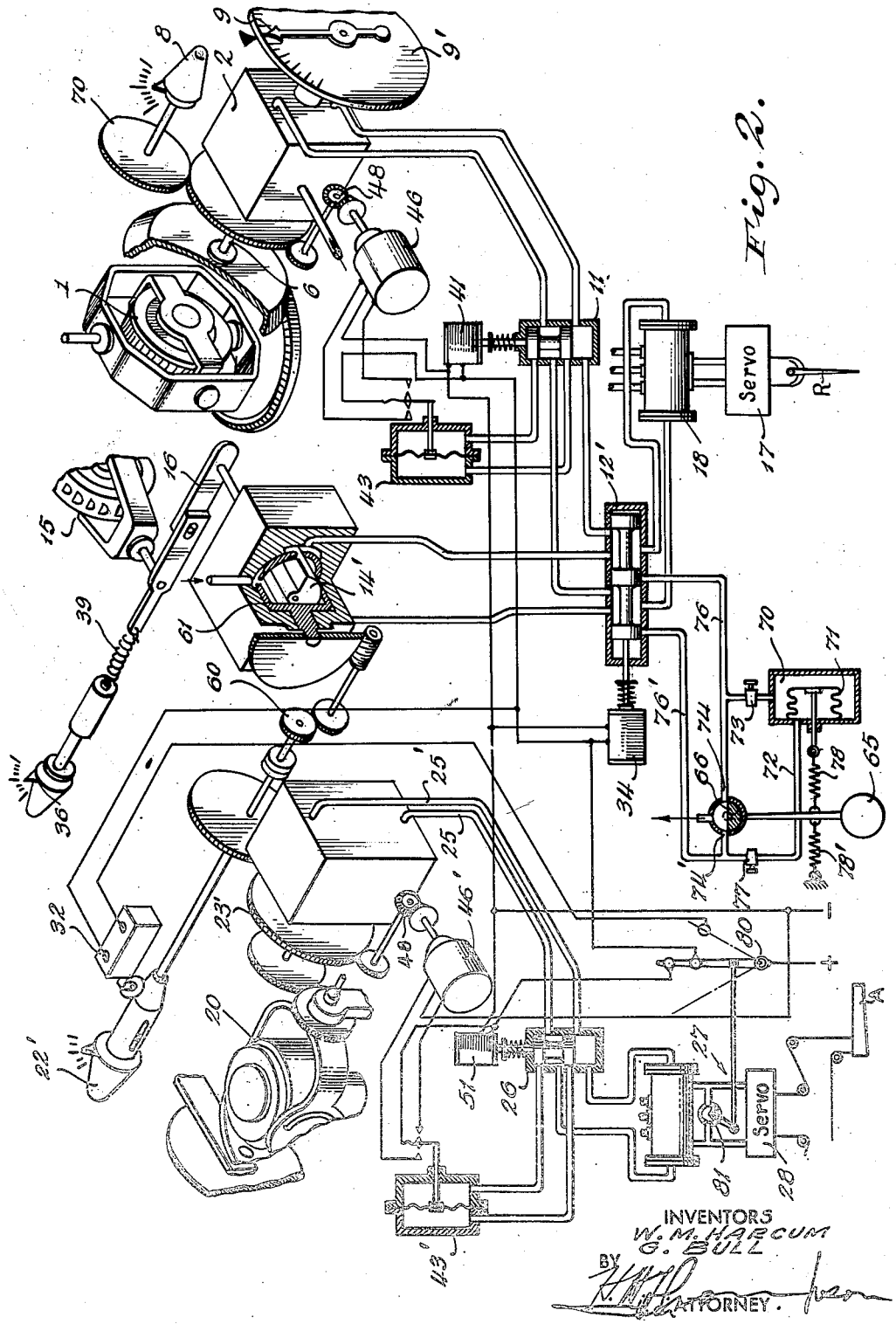
Fig. 2 shows a similar view of a modified form of the invention, in which a different biasing scheme is employed for the rate-of-turn gyroscope, and in which a pendulous auxiliary controller is employed in place of an air speed correction.

In Fig. 2 the showing is similar, except that a different form of biasing or modifying means is employed for the rate gyroscope signal and a different type of corrector. In this form of the invention, the turning of the knob 22' turns directly, through gearing 60, the rotatable ported sleeve 61 of the pick-off valve 14' controlled from the turn gyroscope 15, so that the zero signal position is changed, thereby eliminating the signal which would otherwise be produced by the gyroscope when the aircraft is turning at the rate indicated by the position of the handle 22'. In this form of the invention, no pneumatic signal from the attitude gyroscope enters valve 12'.

A further modification is also shown in Fig. 2 which renders unnecessary the air speed adjustment of Fig. 1. In this case an additional rudder control is provided from a damped spring centralized pendulum 65 which controls pick-off valve 66. The pendulum signals are normally disconnected from the rudder, as shown by the position of the valve 12', but when the knob 22' is pushed in closing switch 32, the signals from the pendulum are placed in control of the rudder servomotor 28, either alone or mixed with the signal from the rate gyroscope. Since the signal will be present from the pendulum whenever the craft is banked improperly, this furnishes a ready means for adjusting the rudder to maintain the craft turning at the proper angle for the banking angle set in.

Preferably we provide means for obtaining a rate as well as displacement signal from the pendulum. A simple method of securing an approximation of such a combined signal is to employ an "anticipator" bellows as a follow-back from the signal to the pendulum, operating somewhat on the principle of the anticipator bellows 30, 31 disclosed and claimed in the aforesaid Kenyon and Zand Patent No. 2,210,916. In this application, the anticipator bellows is shown in the form of a container 70 enclosing a smaller flexible bellows 71 and connected through a throttle valve 73 to a pick-off port 74 by being connected to the pipe 76, which transmits the signal to mixing valve 12'. The interior of the bellows 71 is connected through a pipe 72 and throttle valve 77 with a pick-off port 74', which also is connected to a pipe 76' also leading the signal to the mixing valve 12'. Small bleeds (not shown) are connected to chambers within both container 70 and bellows 71, and the movable wall of the bellows 71 is connected to a spring 78 connected to the pendulum 65 and normally balanced by spring 78'. Alternatively, the bellows may be connected to rotate the housing of the valve 66, as shown in the aforesaid patent. By either arrangement, signals of greater magnitude are obtained for quick movements of the pendulum than for slow movements of equal magnitude, and hence the signals transmitted through pipes 76, 76' are effected both by amount and rate of change of displacement.

In operating an airplane equipped with our improved automatic pilot, the automatic pilot is thrown in by first passing through position (2) of the main switch 80, so that all of the pick-offs are aligned, thus insuring that the craft will continue in the course and attitude prevailing at the time. Properly banked turns are effected through knob 22 or 22', which, when pushed in and turned, banks the craft thereby causing a turn, severs the control from the directional gyroscope, and biases the control from the rate-of-turn gyroscope. The result is that the resulting rate-of-turn is approximately correct for the banking angle set in. During the turn, the pick-off from the directional gyro is kept aligned automatically by motor 46, so that the craft will continue on its new course when the turn is completed.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Means for securing correctly banked turns in an automatic pilot for aircraft including attitude maintaining means for controlling the bank, and direction maintaining means and a rate-of-turn gyroscope for controlling the course, comprising a controller for biasing the bank signals from the attitude maintaining means to cause a bank followed by a turn, a pendulum, and means also operated from said controller for severing the control of course from said direction maintaining means and placing the same under the control of said pendulum and rate-of-turn gyroscope.

2. Means for securing correctly banked turns in an aircraft having an automatic pilot including attitude maintaining means for controlling the ailerons, and direction maintaining means and a rate-of-turn gyroscope for controlling the rudder, comprising a controller for biasing the bank signals from the attitude maintaining means to cause a bank followed by a turn, a pendulum controller, and means operated by said first named controller for severing the connection from said direction maintaining means and placing the rudder under the joint control of the pendulum controller and the rate gyroscope.

3. An automatic banking control device for automatic pilots for aircraft including directional and rate-of-turn gyroscopes and a rudder servomotor for controlling the craft about its yaw axis, a horizon gyroscope and an aileron servomotor for controlling the craft about its bank axis, said respective gyroscopes having two-part control elements on each for said servomotors, and turn control means operable both to shift the relative positions of the parts of the elements of the horizon and rate-of-turn gyroscopes from their normal position and to render the control by the directional gyroscope ineffective.

4. A device as claimed in claim 3, including means for automatically restoring the parts of the control element of the directional gyroscope to a normally aligned position, before the directional gyroscope control is again rendered effective.

5. An automatic banking control device for aircraft automatic pilots including course controlling directional and rate-of-turn gyroscopes, a bank controlling horizon gyroscope, control elements for each of said gyroscopes, and means for causing a correctly banked turn including a single settable means for biasing the bank control elements on the horizon gyroscope and the course control elements on the rate-of-turn gyroscope through an angle proportional to the rate of turn desired, means for severing the control of the course from the directional gyroscope, and means for adjusting the response of the rate gyroscope to turns inversely in accordance with air speed.

6. In a disconnectable automatic pilot for aircraft, a gyro-vertical, a signal generating means for producing a reversible signal upon relative tilt of the craft and said gyro, a reversible servomotor actuated by said signal for governing the attitude of the craft about one of its normally horizontal axes, manually settable means for modifying the signal from said generating means to change the craft's attitude, whereby a preset attitude is maintained and said signal is zeroed by response of the craft thereto, a second normally inoperative servomotor for zeroing said signal whether modified or not when the pilot is out, a three position switch for connecting and disconnecting said automatic pilot, said switch in its intermediate position connecting said second servomotor to said signal to zero the same, whereby the attitude of the craft is never suddenly changed when the pilot is thrown in.

7. Means for securing correctly banked turns in an aircraft having an automatic pilot including attitude and directional gyroscopic means, each having a pick-off means whose output normally controls the ailerons and rudder, respectively, and a spring centralized rate-of-turn gyroscope also normally controlling the rudder, comprising a manually operated controller for biasing the bank signals from the pick-off on the attitude maintaining means to cause a bank followed by a turn, means also operated from said controller for severing the directional pick-off from control of the rudder, means also operated by said controller for biasing the control signal from the rate gyroscope by an amount proportional to the angle of bank set in, and motive means brought into action during turns and actuated from the output of said directional pick-off for maintaining it at zero during turns so that on completion of the turn the craft will continue to fly on the new heading.

8. Means for securing correctly banked turns in an aircraft having an automatic pilot, as claimed in claim 7, which also has a means for proportionally increasing the stiffness of the centralizing springs of the rate gyroscope with increasing air speed to lessen the rudder displacement.

WILLIAM M. HARCUM.
GIFFORD BULL.

REFERENCES CITED

The following references are of record in the file of this patent:

UNITED STATES PATENTS

| Number | Name | Date |
|---|---|---|
| 2,066,194 | Bates | Dec. 29, 1936 |
| 2,126,855 | Wunsch | Aug. 16, 1938 |
| 2,137,974 | Fischel | Nov. 22, 1938 |
| 2,197,898 | Roland | Apr. 23, 1940 |
| 2,238,300 | Zand et al. | Apr. 15, 1941 |
| 2,270,875 | Hanson et al. | Jan. 27, 1942 |
| 2,283,754 | Matthews | May 19, 1942 |
| 2,325,108 | Carlson | July 27, 1943 |
| 2,356,597 | Kronenberger | Aug. 22, 1944 |
| 2,415,430 | Frische | Feb. 11, 1947 |
| 2,416,097 | Hansen | Feb. 18, 1947 |
| 2,516,796 | Noxon et al. | July 25, 1950 |